United States Patent [19]

Casserley

[11] 3,801,397
[45] Apr. 2, 1974

[54] PROCESSING OF LAMINATED TRANSPARENT PANELS

[75] Inventor: Barrie Casserley, Alcester, England

[73] Assignee: Triplex Safety Glass Company Limited, London, England

[22] Filed: Jan. 23, 1970

[21] Appl. No.: 5,362

[30] Foreign Application Priority Data
Jan. 24, 1969 Great Britain...................... 4102/69

[52] U.S. Cl.................... 156/99, 156/105, 156/106, 117/119.4, 65/116
[51] Int. Cl............................................. B32b 17/00
[58] Field of Search ............. 156/99, 105, 106, 282; 117/119.4; 65/116

[56] References Cited
UNITED STATES PATENTS

| 3,532,590 | 10/1970 | Priddle............................ | 156/106 X |
| 3,132,027 | 5/1964 | Norton et al. ................ | 117/119.4 X |
| 3,493,357 | 2/1970 | Agett et al. ............................ | 65/116 |
| 3,242,032 | 3/1966 | Schott................................ | 65/116 X |
| 1,909,444 | 5/1933 | Worrall............................ | 156/105 X |

Primary Examiner—Benjamin R. Padgett
Assistant Examiner—R. L. Tate
Attorney, Agent, or Firm—Scrivener Parker Scrivener and Clarke

[57] ABSTRACT

Laminated transparent panels are normally made by assembling sheets of rigid transparent material, at least one of which is glass, with intervening layers of transparent plastics material which bond the rigid sheets together when the assembly is heated. If the panel is cooled too quickly after the bonding process, as by being plunged into cold water, the glass tends to break. If the panel is cooled too slowly, however, crystallites tend to form in the bonding material thus reducing the transparency of the panel. The invention aims to avoid these difficulties by cooling the heated panels at intermediate rates, a liquid with a thermal conductivity less than that of water being applied to the panel. The liquid may have a thermal conductivity of between 2.0 and 4.0 joule cm/cm$^2$ sec. °C, and a temperature between 15°C and 35°C.

2 Claims, 3 Drawing Figures

PATENTED APR 2 1974  3,801,397

PROCESSING OF LAMINATED TRANSPARENT PANELS

This invention is concerned with improvements in the processing of laminated transparent panels, which panels incorporate bonding layers of transparent plastics materials. The invention is particularly but not exclusively concerned with the production and processing of curved laminated transparent panels intended for use as the windscreens of motor vehicles and aircraft.

Laminated transparent panels are usually made by laminating together two or more sheets of rigid transparent material such as glass, and an interveing layer or intervening layers of a transparent plastics material which serves to bond the sheets together. The laminating process is normally performed by assembling the sheets of rigid transparent material or materials with the intervening bonding layer or layers, and inserting the assembly into a flexible bag of rubber or a suitable plastics material from which the air is extracted by a vacuum pump. The assembly in its evacuated bag is then placed in an oven, or in an air or oil autoclave, and heated to a temperature which is usually in the range of from 100°C to 150°C.

However, it is not always possible to use this method, and in particular, where sheets of glass are used and are bent to complex curvatures for use in the windscreens of motor vehicles, it has been found very difficult to evacuate the flexible bags to the extent necessary to ensure that sufficient air has been removed from between the sheets and the intervening layers to prevent air bubbles being formed in the complete panels. In order to overcome this difficulty a flexible conduit of U-shaped cross-section has been developed. In use this conduit is fitted around the periphery of an assembly with the marginal part of the assembly entering the conduit. The air is then evacuated from within the assembly through the conduit. Apparatus of this kind is the subject of British patent No. 819,179 of Pittsburgh Plate Glass Company.

Under the action of heat and pressure the bonding layers of transparent plastics material melt or soften, and adhere to the adjacent surfaces of the glass or other rigid transparent sheets. The assembly is then removed from the oven or autoclave and allowed to cool in ambient air. However some initially transparent plastics materials used as bonding layers become non-transparent due to the formation of crystallites when cooled naturally in ambient air, and in order to retain the transparency of such materials it is necessary to cool them more rapidly than they cool naturally in air so that there is insufficient time for crystallisation to occur. This loss of transparency during cooling is particularly acute when using bonding layer materials which are based on ethylene copolymers. With the aim of maintaining the transparency of an assembly it has previously been proposed to plunge the assembly into water at about 25°C. This method is usually quite satisfactory for rapidly cooling assemblies which are contained within a flexible bag, or for rapidly cooling unprotected assemblies the overall dimensions of which are relatively small, but it is unsatisfactory for assemblies with relatively large unprotected glass sheets as the thermal shock is excessive and fracture of one or more of the glass sheets often occurs.

The object of the invention is to overcome or reduce these difficulties.

From one aspect the present invention consists in a method of making a laminated transparent panel comprising forming an assembly of at least two sheets of rigid transparent material, at least one of which is a glass sheet, and at least one bonding layer of transparent plastics material, each successive sheet of rigid transparent material in the assembly being separated from the next by such a bonding layer, applying heat and pressure to the assembly so that the transparent plastics material becomes bonded to the adjacent sheets of rigid transparent material and the assembly is converted into the panel, the method being characterized in that the panel is cooled by the application to it of a liquid having a thermal conductivity lower than that of water, the arrangement being such that the reduction in transparency of the transparent plastics material is less than it would have been if the panel had been allowed to cool naturally in air at ambient temperature.

From another aspect the present invention consists in a laminated transparent panel made by the method outlined in the last preceding paragraph.

Use of the method in accordance with the invention reduces the indicence of fracture of the glass while enabling crystallisation of the bonding layer or layers to be prevented or at least reduced to such a low level that the transparency of the layer or of each layer is not materially affected.

It must be understood that although the invention is of particular value in the manufacture of relatively large panels of relatively complex curvature, it is also of value in the manufacture of smaller panels and panels which are flat or substantially flat.

The panels are preferably cooled from a temperature between 100°C and 150°C with the aid of a liquid at a temperature in the range 15°C to 35°C, a convenient temperature being about 25°C. The liquid may be applied to the panel in the form of a spray, or by the panel being immersed in the liquid.

It has been found that the degree of incidence of fracture of the glass depends to some extent on whether or not the marginal parts of the panel are protected. Thus, if a flexible sleeve of U-shaped cross-section is attached to the peripheral edges of the panel before rapid cooling, then the resistance to thermal shock is increased, and the liquid used can have a thermal conductivity close to, but still less than that of water. When the liquid is not applied to the marginal parts of the panel the thermal conductivity of the liquid should be between 2.0 and 4.0 joule cm/cm$^2$ sec.°C, and is preferably between 2.0 and 3.5 joule cm/cm$^2$ sec.°C. When the liquid is applied to the marginal parts of the panel, however, the thermal conductivity of the liquid should be between 2.0 and 3.5 joule cm/cm$^2$ sec. °C, and is preferably between 2.0 and 3.0 joule cm/cm$^2$ sec. °C.

A list of typical liquids which have been used in developing the invention and their thermal conductivities is given in Table I.

The liquids which have been found to have the most satisfactory properties are ethylene glycol, propylene glycol and glycerol. Glycerol has the advantage of having the highest thermal conductivity and therefore giving the most rapid cooling rate. All these liquids are miscible with water, and can be easily removed from the panels by washing the panels with water after they have been cooled. If desired the maximum cooling rate without the fracture of the glass sheets may be obtained by adding water to one of these liquids so that the thermal conductivity of the mixture approaches the appropriate maximum value.

Figure 1:
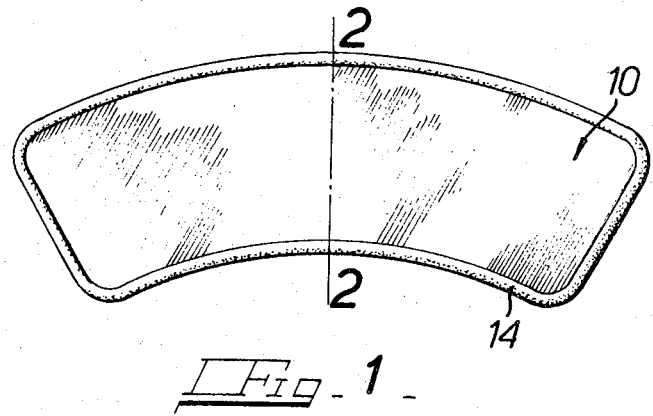
FIG. 1 is a front view of a laminated transparent panel in the course of manufacture.
Figures 2, 3:
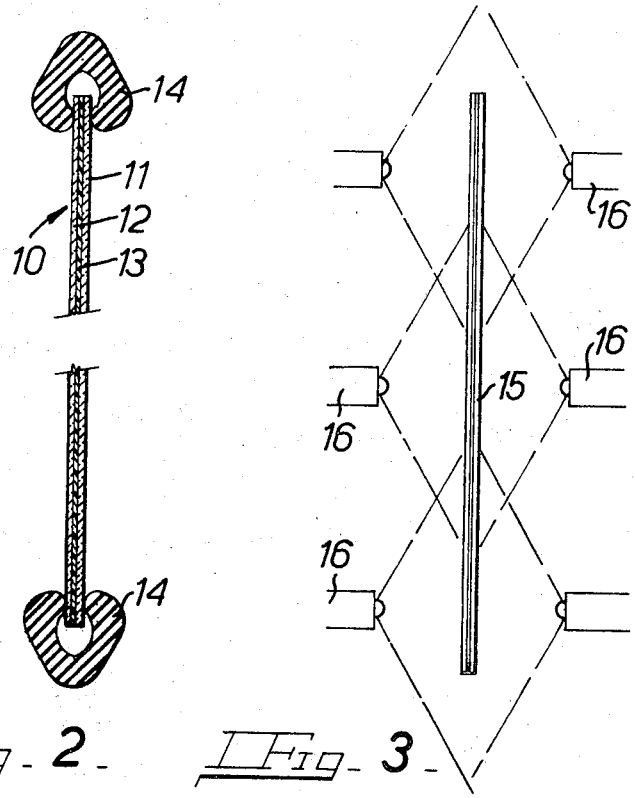
FIG. 2 is a laminar section, to a larger scale, in the plane 2—2 of FIG. 1.
FIG. 3 is an end view of a laminated transparent panel being cooled by sprays of liquid.

The panel 10 shown in FIGS. 1 and 2 comprises sheets of shaped glass 11 and 12 with an intervening bonding layer 13. In manufacture of the panel these components are assembled together and a flexible sleeve 14 of U-shaped cross-section is fitted around the peripheral edges of the assembly. The sleeve is evacuated, by means not illustrated, to withdraw the air from between the layers of the assembly as described above. The whole is then heated to effect bonding and is cooled with the aid of a liquid of an appropriate thermal conductivity. The panel may be immersed in the liquid, or the liquid may be sprayed onto the panel. The sleeve 14 would normally remain on the panel during cooling but could be removed before cooling if desired.

FIG. 3 shows a panel 15 without a peripheral sleeve being cooled, after lamination, by being sprayed with a liquid of an appropriate thermal conductivity. The panel 15 is mounted between arrays of fixed spray-nozzles 16 which direct sprays of liquid of an appropriate thermal conductivity over both sides of the panel simultaneously.

EXAMPLES

In one particular series of experiments illustrating the use of the invention sheets of glass 3mm thick were cut to a size 30 cms square and pieces of bonding layer material of the same size were cut from a roll of ethylene copolymer plastics material 0.76 mm thick, the pieces all being cut from the same roll of material. This material was of the kind described in British patent No. 1,166,443 of Imperial Chemical Industries Limited (Application No. 6389/66). Assemblies were formed, each comprising a piece of the bonding layer material placed between a pair of glass sheets. The assemblies were placed in individual flexible bags of a suitable plastics material, and the air was removed from within the flexible bags by means of a vacuum pump. The assemblies in their flexible bags were placed in an autoclave and heated to a temperature of 120°C for 45 minutes to effect lamination. The resultant panels while remaining in their flexible bags, were removed from the autoclave and allowed to cool to ambient temperature.

When the panels and flexible bags had cooled to ambient temperature, the bags were opened and the panels removed. The panels were then divided into six sets, and placed ready for testing. Each set of panels was reheated in an oven and held at 120°C for 30 minutes. It will be appreciated that the initial cooling of the panels which took place in the plastic bags might have led to the formation of crystallites in the layers of bonding material. When the panels were reheated, however, any such formation of crystallites was reversed so that after the panels had been reheated the state of the layers of bonding material in the panels was indistinguishable from the state of those layers immediately after the initial heating required to effect lamination. Thus the panels, after being reheated, were the exact equivalent of panels which has been laminated in plastic bags but had been removed from those bags while still hot.

The panels were then removed from the oven and each was plunged into one of the following liquids, all of which were maintained at a temperature of 25°C: transformer oil, cylinder oil, propylene glycol, ethylene glycol, glycerol and water.

In another series of experiments further sets of panels were preared, and reheated in an oven where they were held at 120°C for 30 minutes. The panels were then removed from the oven and each was sprayed simultaneously on both major surfaces with each of the previously mentioned liquids, all of which were maintained at a temperature of 25°C.

The results of both these series of experiments are recorded in Table II from which it will be seen that one or both of the glass sheets of each of the panels were fractured when the panels were either immersed in or sprayed with water. The bonding layer of each of the panels which were immersed in or sprayed with transformer oil and cylinder oil showed a loss of transparency which would be unacceptable if the panels were used as the windscreens of motor vehicles but which was less than the loss of transparency which would have occurred if the panels had been cooled in ambient air. However, those panels which were immersed in propylene glycol, ethylene glycol and glycerol were found to be undamaged and to have retained satisfactory transparency. The haze measurements were determined in accordance with ASTM D 1003-61.

Three further sets of panels were prepared as detailed above, and these were maintained at a temperature of 120°C in an oven for 30 minutes. They were then immersed in various percentage concentrations by volume of ethylene glycol and water. In the case of 90 percent ethylene glycol and 10 percent water, it was found that no fracture of the glass in the panels occured and that the transparency of the ethylene copolymer bonding layer was fully retained. With concentration of 80 percent ethylene glycol and 20 percent water about 60 percent of the glass in the panels fractured, but the transparency of the bonding layer was retained. When a concentration of 60 percent ethylene glycol and 40 percent water was used all the glass in the panels was fractured. These results are given in Table III.

A further three sets of panels were prepared as previously described. The peripheral edges of each panel were protected by a sleeve of U-shaped cross-section of silicone rubber before the panel was immersed in various percentage concentrations by volume of ethylene glycol and water.

The results are given in Table IV, and it will be seen that fracture of the glass in the panels did not begin to occur until the concentration had reached 70 percent ethylene glycol and 30 percent water.

Laminated assemblies of more complex constructions formed of multiple layers of glass and rigid transparent plastics material bonded together by intermediate layers of ethylene copolymer interlayer were successfully cooled in pure ethylene glycol. The rigid transparent plastics chosen were stretched polymethyl methacrylate, polyarylcarbonate and allyl diglycol carbonate. The combinations tested are listed in Table V and all gave good clear laminates after immersion in the pure ethylene glycol.

TABLE I

| Liquid Cooling Medium | Thermal Conductivity joule cm/cm$^2$sec. °C at 25°C. |
|---|---|
| Transformer Oil | $1.3 \times 10^{-3}$ |
| Cylinder Oil | $1.5 \times 10^{-3}$ |
| Propylene Glycol | $2.0 \times 10^{-3}$ |
| Ethylene Glycol | $2.6 \times 10^{-3}$ |
| 90% Ethylene Glycol and 10% Water | $2.8 \times 10^{-3}$ |
| Glycerol | $2.9 \times 10^{-3}$ |
| 80% Ethylene Glycol and 20% Water | $3.2 \times 10^{-3}$ |
| 70% Ethylene Glycol and 30% Water | $3.6 \times 10^{-3}$ |
| 60% Ethylene Glycol and 40% Water | $3.8 \times 10^{-3}$ |
| Water | $6.1 \times 10^{-3}$ |

TABLE II

| Liquid Cooling Medium | Fracture of Glass | Clarity | Haze % |
|---|---|---|---|
| Ambient Air | None | Poor | 2.7 to 4.5 |
| Transformer Oil | None | Poor | 2.0 |
| Cylinder Oil | None | Poor | 2.1 |
| Propylene Glycol | None | Fair | 1.3 |
| Ethylene Glycol | None | Good | 1.04 |
| Glycerol | None | Good | 1.05 |
| Water | All Broken | Good | 0.93 |

TABLE III

| Liquid Cooling Medium | Fracture of Glass | Clarity | Haze% |
|---|---|---|---|
| 90% Ethylene Glycol and 10% Water | None | Good | 1.04 |
| 80% Ethylene Glycol and 20% Water | 60% Broken | Good | 1.03 |
| 60% Ethylene Glycol and 40% Water | all broken | Good | 1.00 |

TABLE IV

| Liquid Cooling Medium | Fracture of Glass | Clarity | Haze % |
|---|---|---|---|
| 90% Ethylene Glycol and 10% Water | None | Good | 1.05 |
| 80% Ethylene Glycol and 20% water | None | Good | 1.02 |
| 70% Ethylene Glycol and 30% Water | 10% Broken | Good | 1.03 |
| 60% Ethylene Glycol and 40% Water | all broken | Good | 1.00 |

TABLE V

2mm glass/ECP/2mm glass/ECP/2mm glass.

2mm glass/ECP/2mm glass/ECP/2mm glass/ECP/2mm glass.

3mm glass/ECP/3mm glass/ECP/3mm glass.

3mm glass/ECP/3mm glass/ECP/3mm glass/ECP/3mm glass.

9mm Polymethyl methacrylate/ECP/3mm glass.

5mm Polyarylcarbonate/ECP/3mm glass.

3mm Allyl diglycol carbonate/ECP/3mm glass.

ECP — ethylene copolymer interlayer.

I claim:

1. A method of making a laminated transparent panel comprising forming an assembly of sheets of transparent material, in which rigid sheets alternate with bonding sheets of a plastics material, the outermost sheets being rigid and at least one of them being of glass, applying heat and pressure to the assembly so that the sheets become bonded together and the assembly is thus converted into the panel, and cooling the panel from a temperature between 100°C and 150°C by the direct application to the panel of a liquid at a temperature in the range 15° to 35°C and having a thermal conductivity in the range $2.0 \times 10^{-3}$ to $3.5 \times 10^{-3}$ joule cm/cm$^2$sec.°C, whereby the fracture of the glass sheet or sheets is avoided and significant reduction of transparency of the bonding sheet or sheets due to the formation of crystallites is also avoided.

2. A method according to claim 1 in which the plastics material is an ethylene copolymer which is transparent at least immediately before cooling commences.

* * * * *